UNITED STATES PATENT OFFICE.

LÉON BRUNET, OF BRIOUDE, FRANCE.

MANUFACTURE OF ANTIMONY COLORS.

No. 857,978.     Specification of Letters Patent.     Patented June 25, 1907.

Application filed August 22, 1905. Serial No. 275,297.

*To all whom it may concern:*

Be it known that I, LÉON BRUNET, a citizen of the Republic of France, and a resident of Brioude, Rue St. Pierre, in the Republic of France, chemist, have invented certain new and useful Improvements in the Manufacture of Antimony and Arsenic Colors, for which application has been made in France, April 15, 1905; Germany, June 27, 1905; Austria, July 10, 1905; Belgium, July 8, 1905; Spain, July 12, 1905; Italy, July 25, 1905.

This invention relates to improvements in the manufacture of antimony and arsenic colors, such as white antimony colors or antimony ceruse, and yellow and red sulfid of antimony.

All the processes hitherto known and employed for the manufacture of sulfids of antimony and arsenic, also called antimony vermilion, are based on the following principles. Decomposition of the alkaline, or alkaline earthy sulfo-antimoniates or sulfo-arseniates by hydrochloric or sulfuric acids:

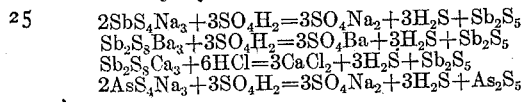

It is evident that in all these reactions there is an excessive yield of sulfidric acid which is a great drawback and further the solutions of the residual products, sulfates or chlorids of sodium or calcium, are industrially worthless. In addition to this the necessary acids for this manufacture have to be purchased. For vermilion of antimony, the hyposulfites of sodium or calcium are separated which are treated with chlorid or sulfate of antimony, adding five or six times the hyposulfite theoretically necessary, the price of which is high. It will be noticed that in these processes the cost of manufacture is very high, and it is evident that for this reason there has not been a regular demand for these colors as pigments for painting, in spite of their remarkable wearing qualities and covering power, and they are sold more particularly for vulcanizing and coloring india-rubber which is an industry which can pay high prices.

The present invention has for its object a process of manufacturing these antimony and arsenic colors by the precipitation of alkaline or alkaline earth sulfo-antimoniates and sulfo-arseniates by means of the gas given off from roasting any suitable metallic sulfids producing sulfurous anhydrid, and more particularly the roasting of antimony ore.

I will now describe particularly the steps by which those versed in the art may carry out the process: The pyrites are roasted as usual, but the gases—sulfurous acid and excess of air, smoke, and soot,—after being passed into a chamber where the smoke (or soot) is deposited, are drawn forward by a strong draft created by a fan. They then pass between the arms of this fan, and the saline solution, such for instance, as sulfo-antimoniate of barium (it would be the same thing with sulfo-arseniate of barium) is introduced through the hollow trunnions of this apparatus. The sulfo-antimoniate of barium thus penetrates by the trunnions and owing to centrifugal force passes along channels formed in the wings of the fan. The liquid is projected in the form of rain, almost like dust, which mixes with the sulfurous anhydrid which passes through the wings. At this moment, the reaction is produced— and it always takes place, as seen, in an acid medium. This very important condition is the cause of the success of the operation. The reaction is as follows:—Sulfo-antimoniate of barium added to sulfurous acid added to air, produce hyposulfite of barium added to yellow sulfite of antimony. The formula is as follows:—

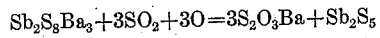

From this equation it will be seen that no $H_2S$ is given off. The precipitate is absolutely pure. The spray projected by the fan falls on the floor of the chamber; from thence it passes into a basin where it rests and the yellow precipitate separates itself from the solution of hyposulfite. It is decanted in the ordinary way; the precipitate is strained and dried in any suitable manner. It is evident that the residual product is very valuable: hyposulfite of soda being utilizable in many ways, more particularly in the same industry of antimony colors for preparing vermilion.

As the process remains the same, whether sulfo-antimoniate or sulfo-arseniate is treated, the scope of my invention evidently includes both.

The solutions of the sulfo-antimoniate are concentrated, the percentage evidently depending on the solubility of each, as known by chemists. The temperature of the solution may be any which is desired by the chemist, for example 150 degrees Fahrenheit. The length of time during which the solution is treated with sulfur di-oxid is regulated by the draft for insuring a complete roasting of the pyrites, but the reaction is quick, because the solution is sprayed.

I declare that what I claim is:—

1. The process of manufacturing antimony coloring matters which consists in the precipitation of solution of sulfo-antimoniate, by the action of sulfurous acid.

2. The process of manufacturing antimony coloring matters which consists in the precipitation of a solution of sulfo-antimoniate of the alkaline earth bases, by the action of sulfurous acid.

In witness whereof, I have hereunto signed my name this 8th day of August 1905, in the presence of two subscribing witnesses.

LÉON BRUNET.

Witnesses:
ANTONNI MONTEILTRET,
HANSON C. COXE.